(12) United States Patent
Shimomura

(10) Patent No.: US 6,507,445 B1
(45) Date of Patent: Jan. 14, 2003

(54) OPTICAL SYSTEM AND ORIGINAL READING APPARATUS

(75) Inventor: Hidekazu Shimomura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/717,239

(22) Filed: Nov. 22, 2000

(30) Foreign Application Priority Data

Nov. 29, 1999 (JP) ............................................ 11-337439
May 11, 2000 (JP) ...................................... 2000-138907
Nov. 15, 2000 (JP) ...................................... 2000-348065

(51) Int. Cl.$^7$ .............................. G02B 9/36; G02B 9/08
(52) U.S. Cl. ...................................... 359/775; 359/740
(58) Field of Search ........................ 359/771, 775–776, 359/739–740, 741–742, 566, 569–571, 576

(56) References Cited

U.S. PATENT DOCUMENTS 5,847,877 A  * 12/1998  Inamura et al. ............. 359/566
5,930,043 A     7/1999  Ogawa ........................ 359/566
6,064,057 A     5/2000  Shimomura et al. ......... 250/226
6,157,488 A  * 12/2000  Ishii ........................... 359/569
6,208,474 B1    3/2001  Kondo ........................ 359/775

* cited by examiner

Primary Examiner—Jordan M. Schwartz
(74) Attorney, Agent, or Firm—Fitzpatrick, Cella, Harper & Scinto

(57) ABSTRACT

An optical system provided with a lens, a stop and a diffraction grating is characterized in that when in a state wherein the diffraction grating is absent, the value of the coefficient of chromatic aberration of magnification of the wavelength of the long wavelength side relative to the reference wavelength of light is positive, the diffraction grating is disposed more adjacent to an incidence surface side than the stop, and when in the state wherein the diffraction grating is absent, the value of the coefficient of chromatic aberration of magnification of the wavelength of the long wavelength side relative to the reference wavelength of the light is negative, the diffraction grating is disposed more adjacent to an emergence side than the stop.

13 Claims, 12 Drawing Sheets

MAIN SCANNING DIRECTION ⊙ → SUB SCANNING DIRECTION C

OPTICAL SYSTEM AND ORIGINAL READING APPARATUS

BACKGROUND OF THE INVENTION

1. Field of the Invention

This invention relates to an optical system and an original reading apparatus, and particularly is adapted to highly accurately read image information on the surface of an original by a reading element (solid state image pickup element) such as a line sensor by the use of an original reading lens having a diffraction grating.

2. Related Background Art

There have heretofore been proposed various original reading apparatuses adapted to reduce and image the image information on the surface of an original such as a document or literature on the surface of a line sensor (CCD) by an original reading lens, and read the image information as electronic information by a signal from the line sensor.

In this case, as the original reading lens, a lens system is desired which is compact as a whole and moreover can easily obtain relatively high optical performance. As an original reading lens satisfying such a desire, there is, for example, a symmetrical type lens system comprising a plurality of lenses disposed symmetrically about a stop. At this symmetrical type lens system, there is, for example, a Gaussian type lens of four-unit six-lens construction.

Generally the symmetrical type lens system has the feature that images of particularly high resolving power and high quality can be obtained easily.

When the image information on the surface of the original is to be reduced and imaged on the surface of the line sensor by the original reading lens, and the image information is to be read as electronic information by the signal from the line sensor, it becomes important for the whole of the surface of the original to be imaged with high resolving power on the surface of the line sensor.

As the original reading lens, for example, a Tesser type one of three-unit four-lens construction is relatively sufficiently well corrected in various aberrations such as spherical aberration, field curvature aberration and distortion aberration.

However, there has been a tendency for astigmatism at a medium angle of view and off-axis coma to remain high. Therefore, the original reading lens of the Tesser type is used in an original reading apparatus having relatively low resolution and a narrow angle of view.

Also, the original reading lens of the Tesser type is corrected to a certain level in chromatic aberration, particularly on-axis chromatic aberration, but could not always be said to be sufficiently satisfactory as a color image reading lens system.

Particularly it is over corrected at the short wavelength side of the visible wavelength area of the on-axis chromatic aberration, and is conversely under-corrected at the long wavelength side, and it has been difficult to well correct the on-axis chromatic aberration in a wide range of the visible wavelength area and such original reading lens has had residual chromatic aberration (secondary spectrum). This has led to the problem that when such an original reading lens is used, for example, in a color image reading apparatus such as an image scanner, the focus positions for R (red), G (green) and B (blue) color lights somewhat differ from one another and the deterioration of read images occurs.

On the other hand, a Gaussian type original reading lens of four-unit six-lens construction is sufficiently corrected in various aberrations such as spherical aberration, coma and field curvature aberration.

Regarding chromatic aberration, however, it has residual chromatic aberration (secondary spectrum) like the aforedescribed Tesser type original reading lens of three-unit four-lens construction. This has led to the problem that the focus positions for R, G and B color lights differ from one another and the deterioration of read images occurs.

To correct this residual chromatic aberration for a wide band wavelength, it is necessary to use glass having an abnormal portion dispersing property which is also small in the variation in refractive index for the wide band wavelength (abnormal dispersion glass), but there has been the problem that the glass of this type is generally expensive and difficult to work.

Also, there has been proposed an original reading lens using a diffraction grating for reducing chromatic aberration. This original reading lens, however, has suffered from the problem that the deterioration of read images occurs due to flare lights of the other orders than the design order. As a technique for reducing such flare lights, there is the technique of laminating two kinds of resins 105 and 106 differing in dispersing characteristic on one of substrates 104 as shown, for example, in FIGS. 14 and 15 of the accompanying drawings. However, the type of FIG. 14 in which the grating depths $d_1$ and $d_2$ differ from each other has suffered from the problem that manufacture is difficult, and the type of FIG. 15 has suffered from the problem that the grating depth d is as great as 80–90 $\mu$m and rays of light with an angle of view are reflected by the portions of the walls of the grating.

SUMMARY OF THE INVENTION

It is an object of the present invention to provide an original reading lens which can well correct particularly on-axis chromatic aberration and chromatic aberration of magnification of various magnifications over a wide band by utilizing a laminated type optical element (laminated type diffraction grating) easy to manufacture, and highly accurately read image information as electronic information, and an original reading apparatus using the same.

It is another object of the present invention to provide an original reading lens of four-unit four-lens construction comprising four units and four lenses disposed substantially symmetrically about a stop in which the lens construction can be set appropriately and which can reduce and image the image information of the entire surface of an original with high resolving power on the surface of a reading element in spite of the number of constituent lenses being small, and can decrease flare lights of the other orders than the design order of a diffraction grating, and an original reading apparatus using the same.

An optical system according to an embodiment of the present invention is an optical system provided with a lens, a stop and a diffraction grating, characterized in that when in a state wherein the diffraction grating is absent, the value of the coefficient of chromatic aberration of magnification of the wavelength of the long wavelength side relative to the reference wavelength of light is positive, the diffraction grating is disposed more adjacent to an incidence surface side than the stop, and when in the state wherein the diffraction grating is absent, the value of the coefficient of chromatic aberration of magnification of the wavelength of the long wavelength side relative to the reference wavelength of the light is negative, the diffraction grating is disposed more adjacent to an emergence side than the stop.

An optical system according to another embodiment of the present invention is the above-described optical system characterized in that the lens constituting the optical system comprises four or less lenses, and is an optical element in which in the state wherein the diffraction grating is absent, the value of the coefficient of chromatic aberration of magnification of the wavelength of the long wavelength side relative to the reference wavelength of the light is positive, and the diffraction grating is disposed more adjacent to the incidence surface side than the stop.

An optical system according to another embodiment of the present invention is the above-described optical system characterized in that the lens constituting the optical system consists, in succession from the incidence surface side, a meniscus-shaped positive first lens having its convex surface facing the incidence surface side, a meniscus-shaped negative second lens having its convex surface facing the incidence surface side, a stop, a meniscus-shaped negative third lens having its convex surface facing the emergence side, and a meniscus-shaped positive fourth lens having its convex surface facing the emergence side.

An optical system according to another embodiment of the present invention is the above-described optical system characterized in that the diffraction grating is disposed between the second lens and the stop.

An optical system according to another embodiment of the present invention is the above-described optical system characterized in that when the Abbe numbers of the materials of the first lens and the fourth lens are defined as vp1 and vp2, respectively, and the Abbe numbers of the materials of the second lens and the third lens are defined as vm1 and vm2, respectively, the Abbe numbers vp1 and vp2 are 50 or greater and the Abbe numbers vm1 and vm2 are 35 or less.

An original reading apparatus according to an embodiment of the present invention is an original reading apparatus provided with an original reading lens for imaging image information on the surface of an original illuminated by a light source on the surface of a reading element and a stop and a diffraction grating disposed in the original reading lens. The original reading apparatus is characterized in that when in a state wherein the diffraction grating is absent, the value of the coefficient of chromatic aberration of magnification of the wavelength of the long wavelength side relative to the reference wavelength of the light source is positive, the diffraction grating is disposed more adjacent to the surface of the original than the stop. When in the state wherein the diffraction grating is absent, the value of the coefficient of chromatic aberration of magnification of the wavelength of the long wavelength side relative to the reference wavelength of the light source is negative, the diffraction grating is disposed more adjacent to the reading element than the stop.

An original reading apparatus according to another embodiment of the present invention is the above-described original reading apparatus characterized in that the lens constituting the original reading lens comprises four or less lenses, and is a lens in which in the state wherein the diffraction grating is absent, the value of the coefficient of chromatic aberration of magnification of the wavelength of the long wavelength side relative to the reference wavelength of the light source is positive, and the diffraction grating is disposed more adjacent to the surface of the original than the stop.

An original reading apparatus according to another embodiment of the present invention is the above-described original reading apparatus characterized in that the original reading lens consists, in succession from the surface side of the original, a meniscus-shaped positive first lens having its convex surface facing the surface side of the original, a meniscus-shaped negative second lens having its convex surface facing the surface side of the original, a stop, a meniscus-shaped negative third lens having its convex surface facing the reading element side, and a meniscus-shaped positive fourth lens having its convex surface facing the reading element side.

An original reading apparatus according to another embodiment of the present invention is the above-described original reading apparatus characterized in that the diffraction grating is disposed between the second lens and the stop.

An original reading apparatus according to another embodiment of the present invention is the above-described original reading apparatus characterized in that when the Abbe numbers of the materials of the first lens and the fourth lens are defined as vp1 and vp2, respectively, and the Abbe numbers of the materials of the second lens and the third lens are defined as vm1 and vm2, respectively, the Abbe numbers vp1 and vp2 are 50 or greater and the Abbe numbers vm1 and vm2 are 35 or less.

An original reading apparatus according to another embodiment of the present invention is an original reading apparatus provided with an original reading lens for imaging image information on the surface of an original illuminated by a light source on the surface of a reading element. The original reading apparatus is characterized in that the original reading lens has a laminated type optical element in which the diffraction grating surfaces of a first substrate provided with a first optical element having a diffraction grating of a convex shape and a second substrate provided with a second optical element having a diffraction grating of a concave shape are joined together in opposed relationship with each other.

An original reading apparatus according to another embodiment of the present invention is the above-described original reading apparatus characterized in that of distracted lights of respective orders distracted by the diffraction gratings and incident on the reading element, diffracted lights of the other orders than the design order are set so that the quantity of light thereof may be 5% or less relative to the quantity of light of the diffracted light of the design order.

An original reading apparatus according to another embodiment of the present invention is the above-described original reading apparatus characterized in that of diffracted lights of respective orders diffracted by the diffraction gratings and incident on the reading element, diffracted lights of the other orders than design order are set so that the quantity of on-axis light thereof and the quantity of the most off-axis light thereof may be substantially equal to each other.

An original reading apparatus according to another embodiment of the present invention is the above-described original reading apparatus characterized in that when the grating depths of the diffraction gratings of the first and second optical elements are defined as d1 and d2, respectively, the grating depths d1 and d2 are determined from the following expressions:

$$\{n_1(\lambda a)-1\}d_1-\{n_2(\lambda a)-1\}d_2=m\lambda a$$

$$\{n_1(\lambda b)-1\}d_1-\{n_2(\lambda b)-1\}d_2=m\lambda b$$

$$0.40<\lambda a<0.50$$

$$0.51<\lambda b<0.62$$

where n₁: the refractive index of the material of the first optical element;

n₂: the refractive index of the material of the second optical element;

λa: the first set wavelength (μm);

λb: the second set wavelength (μm):

m: 1, 2, 3, . . . .

An original reading apparatus according to another embodiment of the present invention is the above-described original reading apparatus characterized in that when in a state wherein the laminated type optical element is absent, the value of the coefficient of chromatic aberration of magnification of the wavelength of the long wavelength side relative to the reference wavelength of the light source is positive, the laminated type optical element is disposed more adjacent to the surface side of the original than the stop. When in the state wherein the laminated type optical element is absent, the value of the coefficient of chromatic aberration of magnification of the wavelength of the long wavelength side relative to the reference wavelength of the light source is negative, the laminated type optical element is disposed more adjacent to the reading element side than the stop.

An original reading apparatus according to another embodiment is the above-described original reading apparatus characterized in that the lens constituting the original reading lens comprises four or less lenses, and is a lens in which in the state wherein the laminated type optical element is absent, the value of the coefficient of chromatic aberration of magnification of the wavelength of the long wavelength side relative to the reference wavelength of the light source is positive, and the laminated type optical element is disposed more adjacent to the surface side of the original than the stop.

DESCRIPTION OF THE PREFERRED EMBODIMENTS

Figure 1:
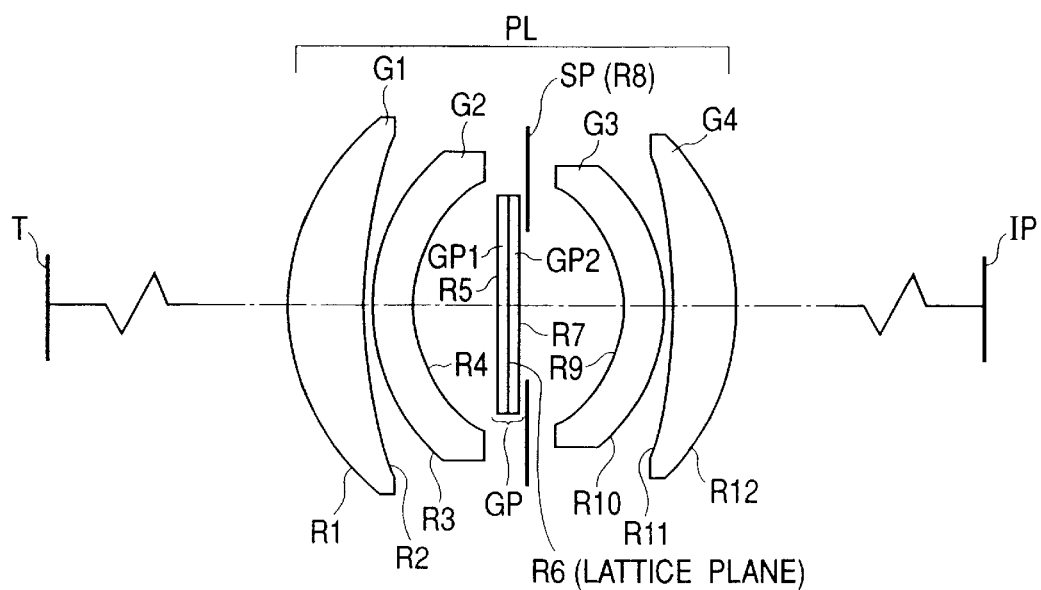
FIG. 1 is a cross-sectional view of a lens according to Numerical Value Embodiment 1 of the present invention.
Figure 2:
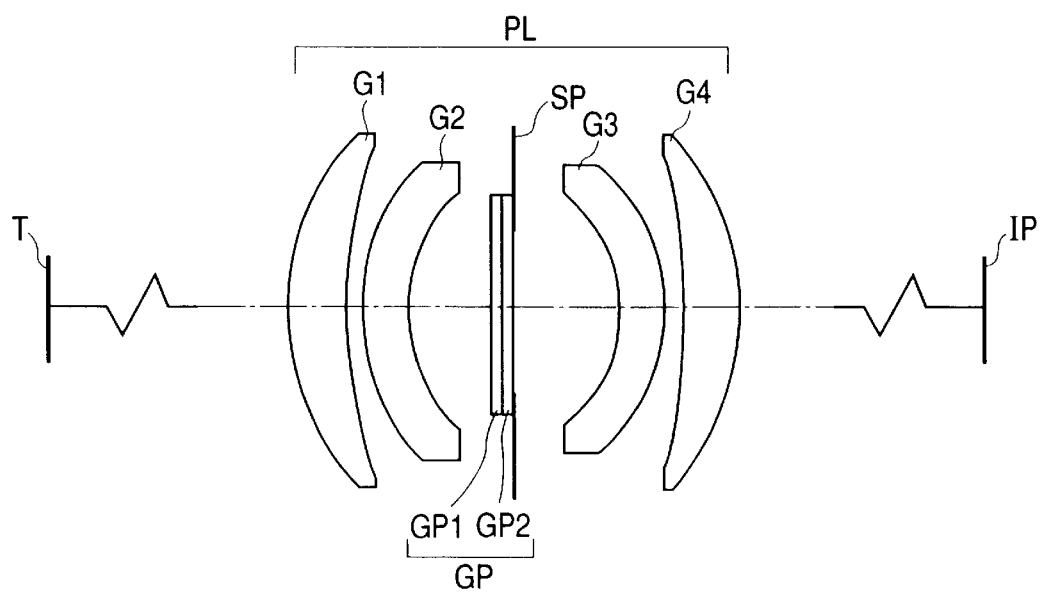
FIG. 2 is a cross-sectional view of a lens according to Numerical Value Embodiment 2 of the present invention.
Figure 3:
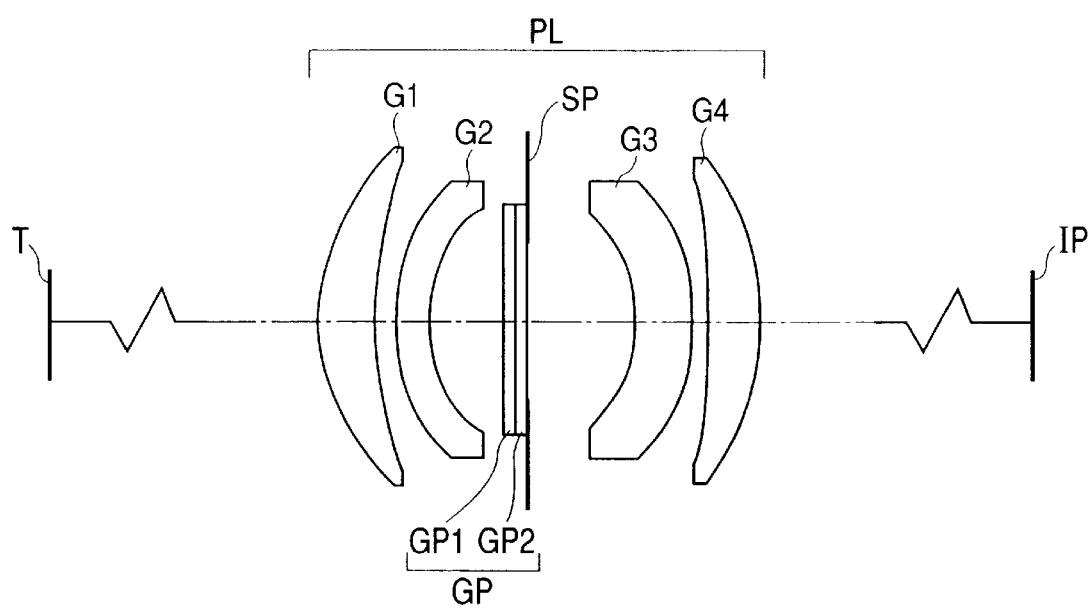
FIG. 3 is a cross-sectional view of a lens according to Numerical Value Embodiment 3 of the present invention.
Figure 4:
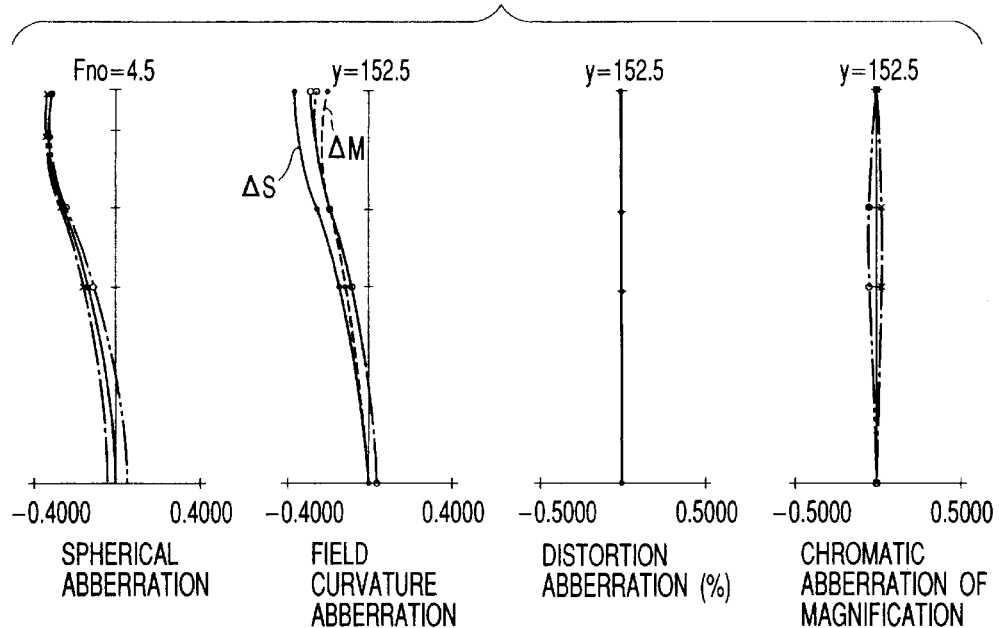
FIG. 4 shows the aberrations of Numerical Value Embodiment 1 of the present invention.
Figure 5:
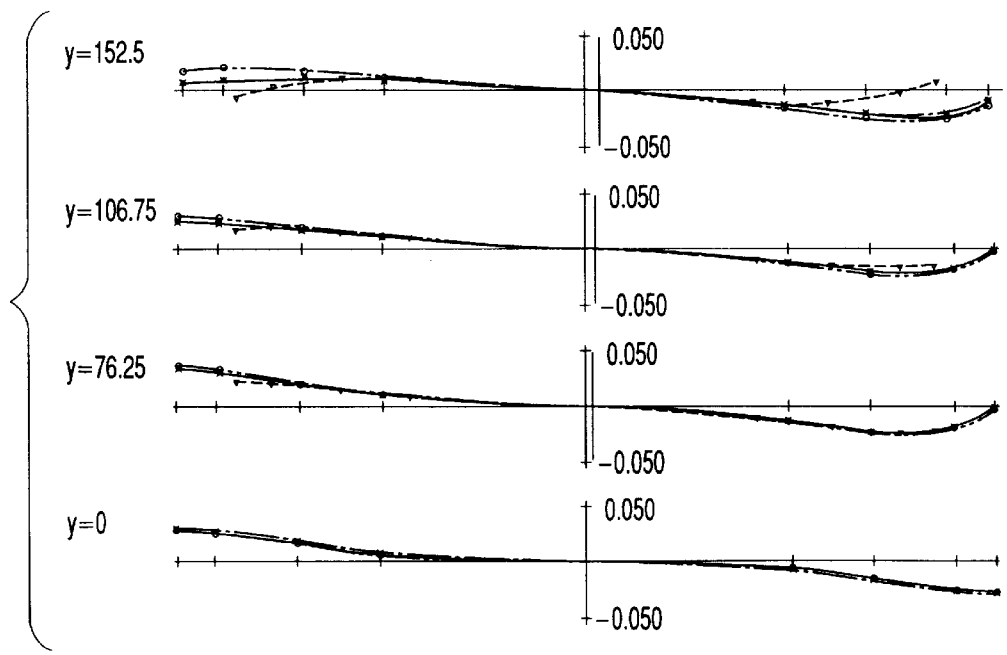
FIG. 5 shows the aberrations of Numerical Value Embodiment 1 of the present invention.
Figure 6:
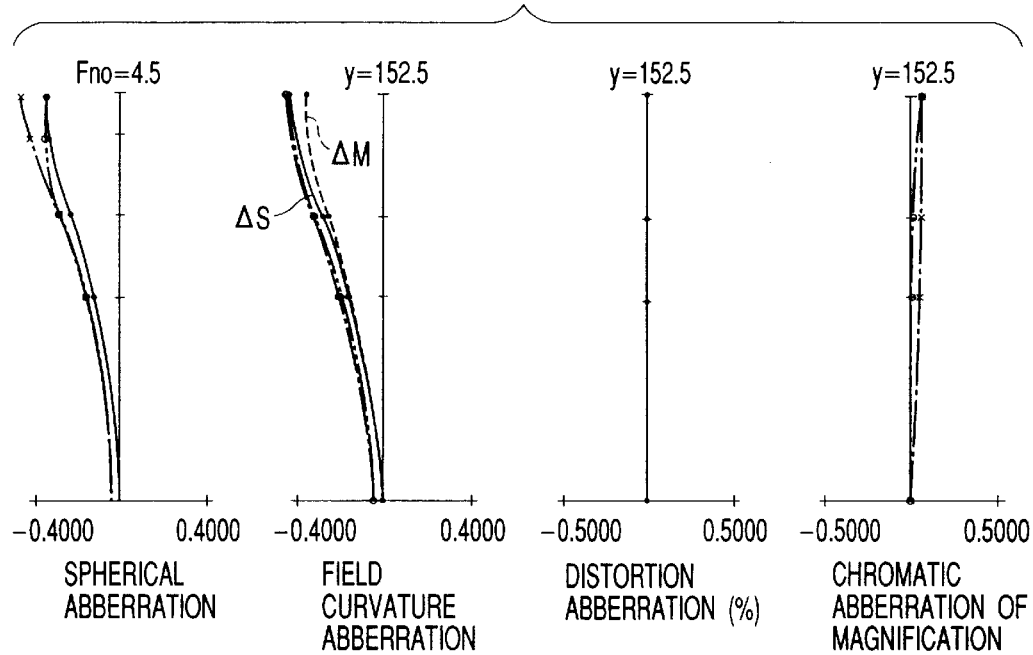
FIG. 6 shows the aberrations of Numerical Value Embodiment 2 of the present invention.
Figure 7:
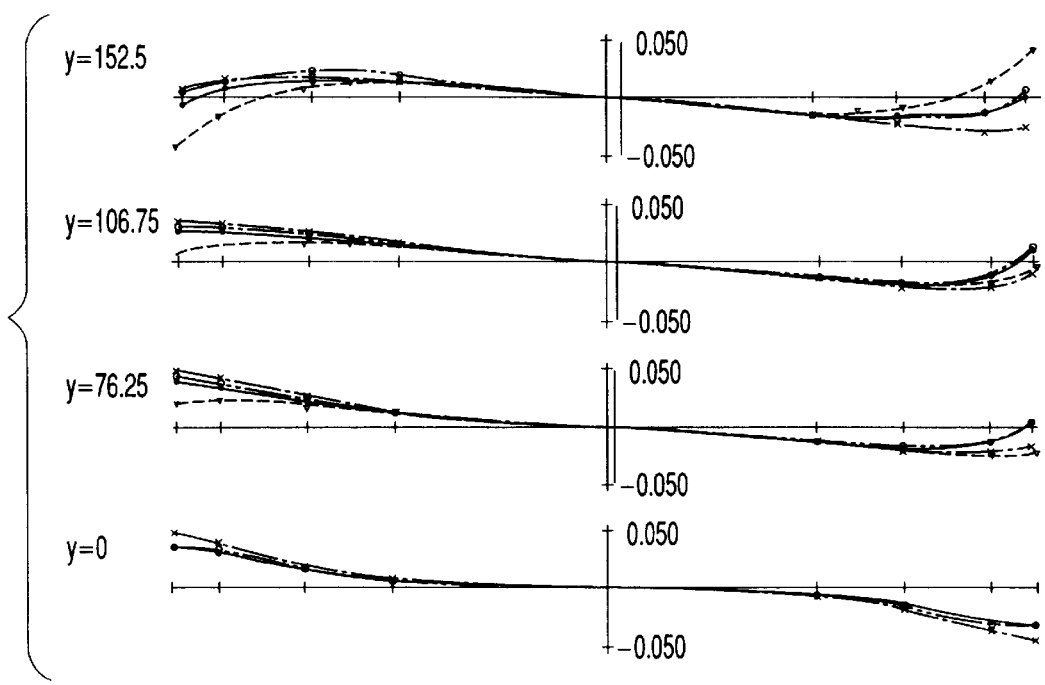
FIG. 7 shows the aberrations of Numerical Value Embodiment 2 of the present invention.
Figure 8:
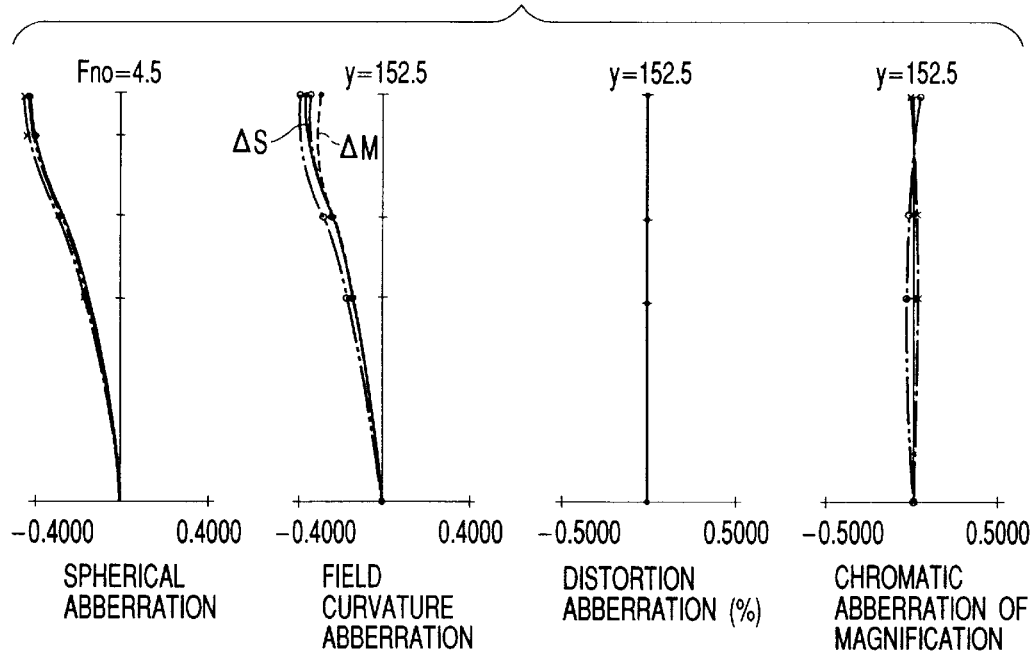
FIG. 8 shows the aberrations of Numerical Value Embodiment 3 of the present invention.
Figure 9:
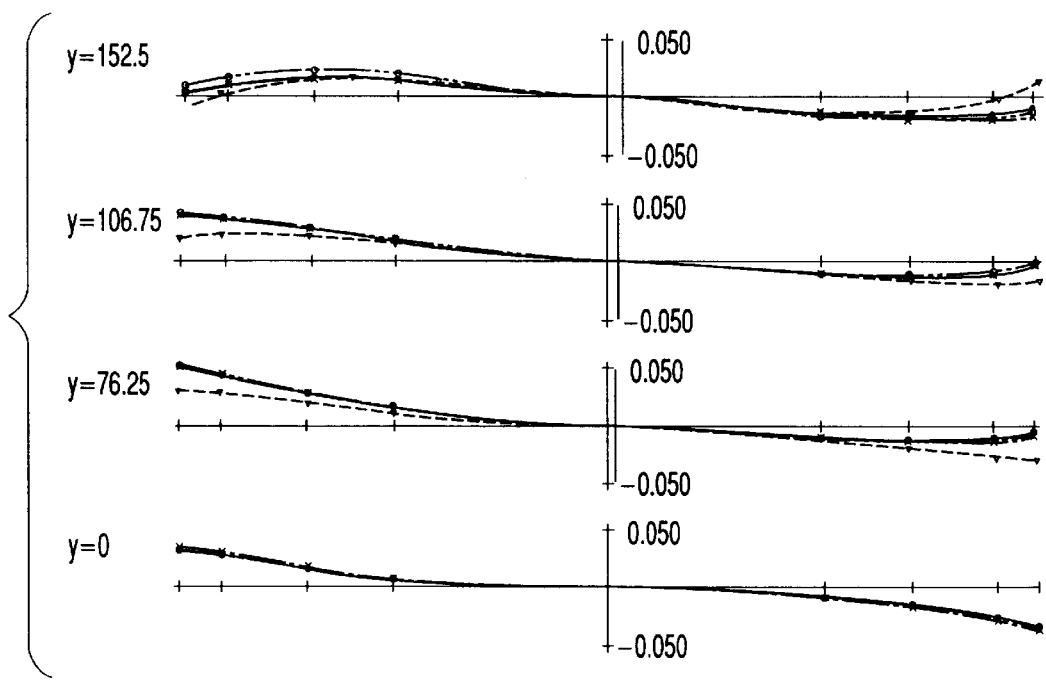
FIG. 9 shows the aberrations of Numerical Value Embodiment 3 of the present invention.

FIGS. 1 to 3 are cross-sectional views of lenses according to Numerical Value Embodiments 1 to 3 of the original reading lens of the present invention which will be described later. FIGS. 4 and 5 show the aberrations of Numerical Value Embodiments 1 of the present invention at the wavelengths shown in Table 1 when the imaging magnification $\beta = -0.22028$, FIGS. 6 and 7 show the aberrations of Numerical Value Embodiment 2 of the present invention when the imaging magnification $\beta = -0.22028$, and FIGS. 8 and 9 show the aberrations of Numerical Value Embodiment 3 of the present invention when the imaging magnification $\beta = -0.22028$.

In the figures, the letters PL designate an original reading lens which images image information on the surface T of an original illuminated by a light source comprising, for example, an Xe lamp (xenon lamp) on the surface of a reading element IP. The letter T denotes the surface of the original, and image information is formed on this surface. The letters IP designate a line sensor (CCD) as the reading element. The letters Gi denote the ith lenses constituting the original reading lens PL, and the letters SP designate a stop.

The letters GP denote a laminated type optical element (laminated type diffraction grating) in which the diffraction grating surfaces of first flat glass (optical element) GP1 having a difraction grating of a convex shape and second flat glass (optical element) GP2 having a diffraction grating of a concave shape are opposed and joined to each other.

Of the ith lenses Gi constituting the original reading lens PL, G1 is a meniscus-shaped positive first lens having its convex surface facing the surface side of the original, G2 is a meniscus-shaped negative second lens having its convex surface facing the surface side of the original, G3 is a meniscus-shaped negative third lens having its convex surface facing the line sensor side, and G4 is a meniscus-shaped positive fourth lens having is convex surface facing the line sensor side. In Numerical Value Embodiments 1 to 3, the stop SP is disposed between the second lens G2 and the third lens G3, and the laminated type optical element GP is disposed between the second lens G2 and the stop SP.

In Table 1 which will be described later, there are shown the coefficient L of on-axis chromatic aberration and the coefficient T of chromatic aberration of magnification in a state wherein the laminated type optical element GP in each Numerical Value Embodiment is absent.

In the present invention, in a case where as shown in FIGS. 1, 2 and 3, the original reading lens PL is of four-lens construction, when it is taken into account that spherical aberration, field curvature aberration and distortion aberration in the reading element IP are restrained and on-axis chromatic aberration and chromatic aberration of magnification are restrained, it is found out, as can be seen from Table 1, that in the state wherein the laminated type optical element GP is absent, the sign (value) of the coefficient T of chromatic aberration of magnification of the wavelength of the long wavelength side relative to the reference wavelength of the light source tends to become positive. Also, the laminated type optical element GP is disposed more adjacent to the surface T of the original than the stop SP, i.e., between the second lens G2 and the stop SP, and at all angles of view, chromatic aberration of magnification and on-axis chromatic aberration are also corrected well.

When it is taken into account that the above-noted matter restrains spherical aberration, field curvature aberration, distortion aberration, on-axis chromatic aberration and chromatic aberration of magnification in the reading element IP, the tendency for the sign (value) of the coefficient T of chromatic aberration of magnification of the wavelength of the long wavelength side relative to the reference wavelength of the light source to become positive in the state wherein the laminated type optical element GP is absent also holds true in the case of a construction in which the original reading lens PL is comprised of three or less lenses.

Also, in the case of the laminated type optical element of the present invention, the diffraction grating surface is formed on substrate glass and therefore, the distance from the top to the diffraction grating surface must be made equal to or greater than the thickness of the substrate glass. The absolute value of the coefficient T of chromatic aberration of magnification tends to become greater as the diffraction grating surface becomes farther from the stop and therefore, when the laminated type optical element is disposed more adjacent to the emergence surface side than the stop and spherical aberration, field curvature aberration, distortion aberration and on-axis chromatic aberration are restrained well, chromatic aberration of magnification will become under-corrected if the number of lenses is four or less.

Consequently, in a case where the original reading lens PL is comprised of four or less lenses, when it is taken into account that at all angles of view in the reading element IP, chromatic aberration of magnification and on-axis chromatic aberration are corrected well, it is necessary to dispose the laminated type optical element GP more adjacent to the surface T of the original than the stop SP.

In the present invention, when an original reading lens PL in which all aberrations (chromatic aberration of magnification, on-axis chromatic aberration, spherical aberration, field curvature aberration, distortion aberration, etc) are restrained is to be optically designed, to realize the restraint of the number of lenses, it has been found that it is preferable to adopt such a lens construction that in the state wherein the laminated type optical element GP is absent, the sign (value) of the coefficient T of chromatic aberration of magnification of the wavelength of the long wavelength side relative to the reference wavelength of the light source becomes positive.

That is, in the present invention, it has been found that to realize the restraint of the number of lenses, it is preferable to adopt a construction in which the original reading lens is comprised of four or less lenses, and dispose the laminated type optical element GP more adjacent to the surface T of the original than the stop SP.

Conversely, in the case of a construction in which the original reading lens PL is comprised of five or more lenses, the number of lenses is great and therefore, in the state wherein the laminated type optical element GP is absent, whether the sign (value) of the coefficient T of chromatic aberration of magnification of the wavelength of the long wavelength side relative to the reference wavelength of the light source is positive or negative, it is possible to restrain spherical aberration, field curvature aberration and distortion aberration in the reading element IP and also restrain on-axis chromatic aberration and chromatic aberration of magnification in the laminated type optical element.

Consequently, when in the state wherein the laminated type optical element GP is absent, the sign (value) of the coefficient T of chromatic aberration of magnification of the wavelength of the long wavelength side relative to the reference wavelength of the light source is negative, the laminated type optical element GP can be disposed more adjacent to the line sensor IP than the stop SP.

Figure 16:
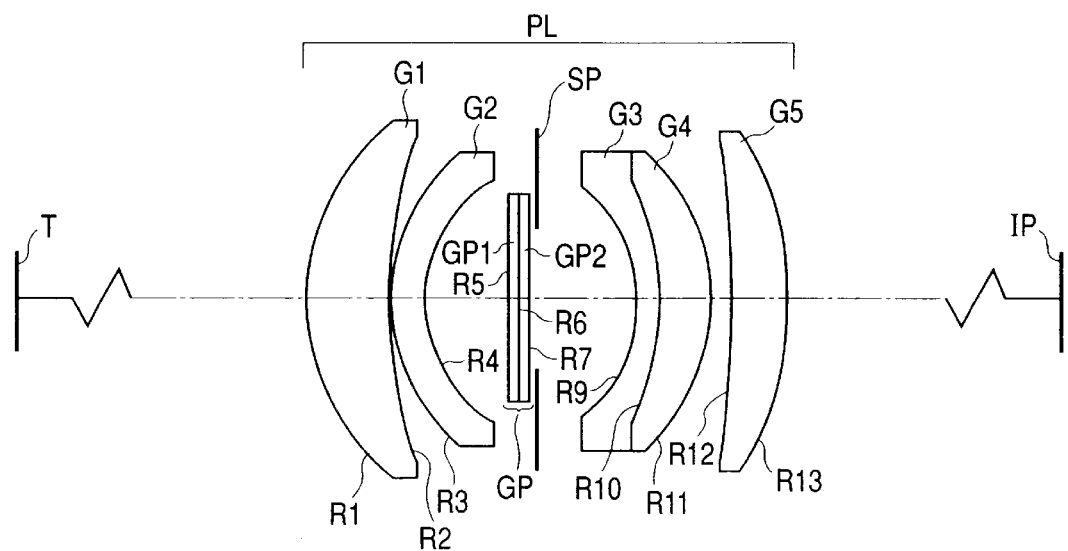
FIG. 16 is a cross-sectional view of a lens according to Numerical Value Embodiment 4 of the present invention.
Figure 17:
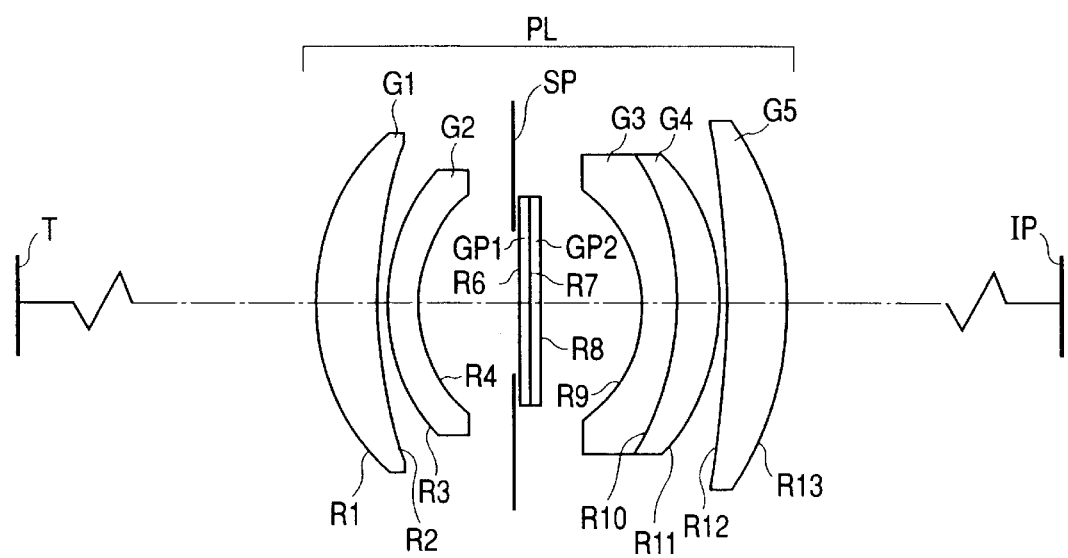
FIG. 17 is a cross-sectional view of a lens according to Numerical Value Embodiment 5 of the present invention.
Figure 18A:
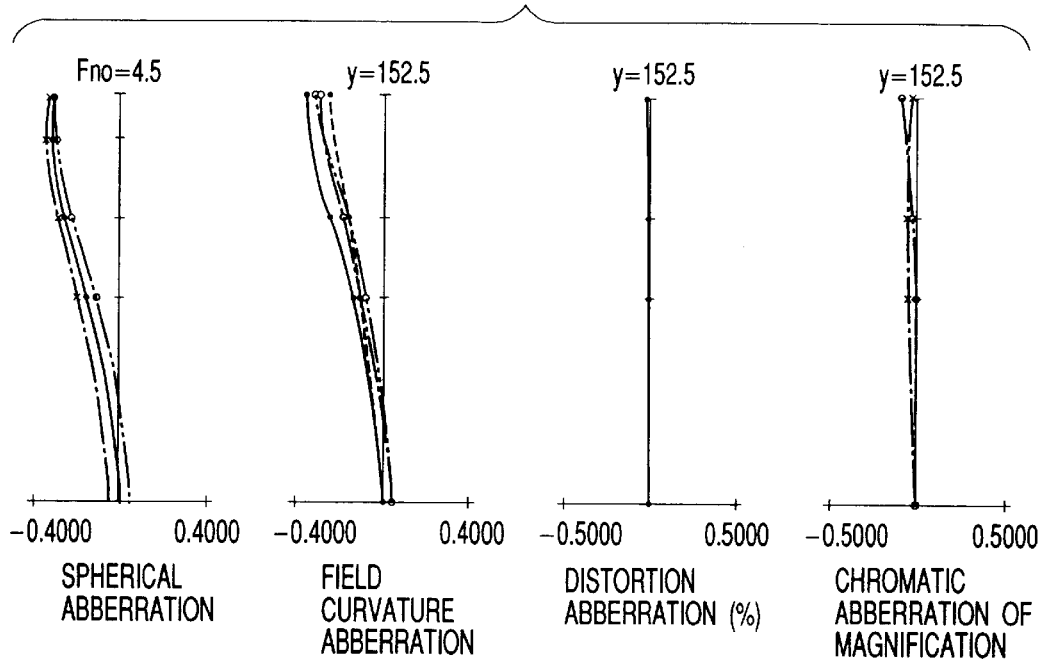
FIGS. 18A and 18B show the aberrations of Numerical Value Embodiment 4 of the present invention.
Figure 18B:
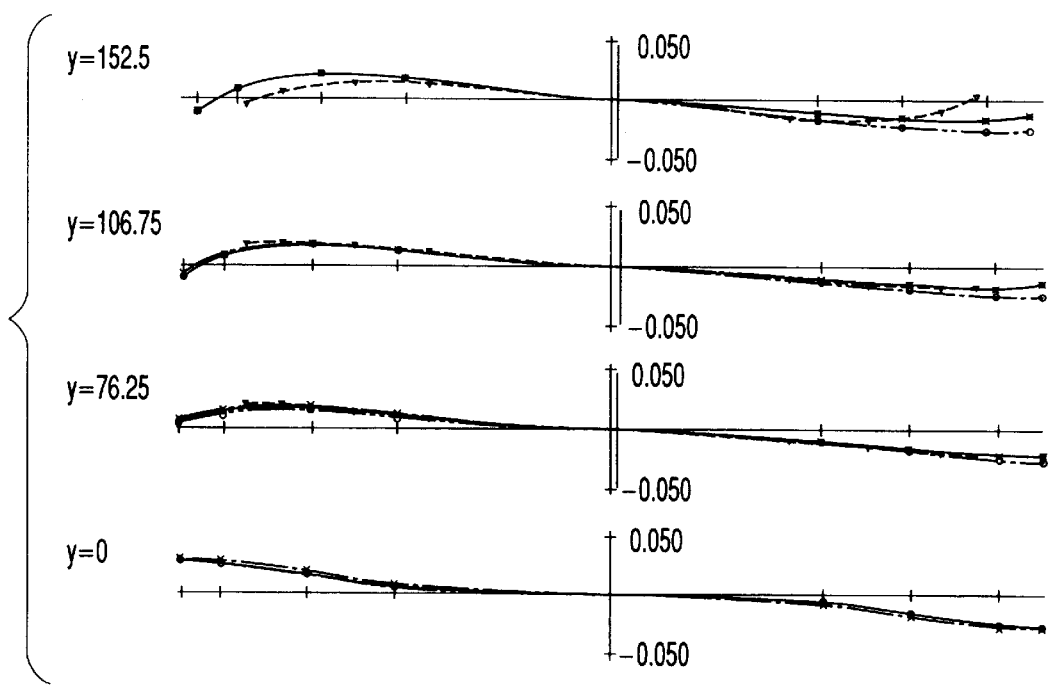
Figure 19A:
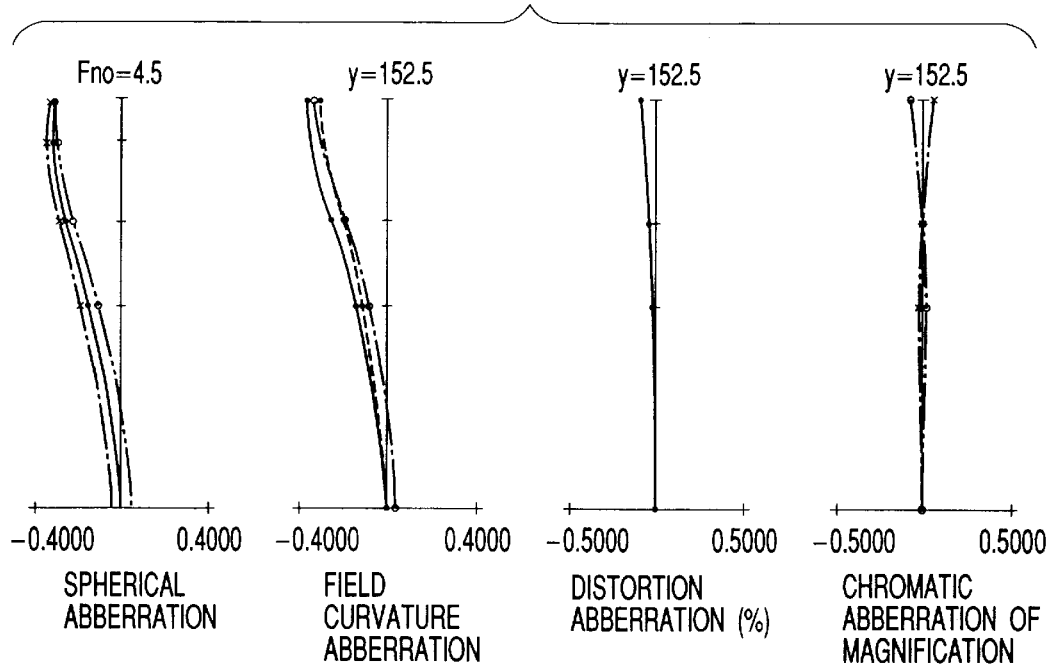
FIGS. 19A and 19B show the aberrations of Numerical Value Embodiment 5 of the present invention.
Figure 19B:
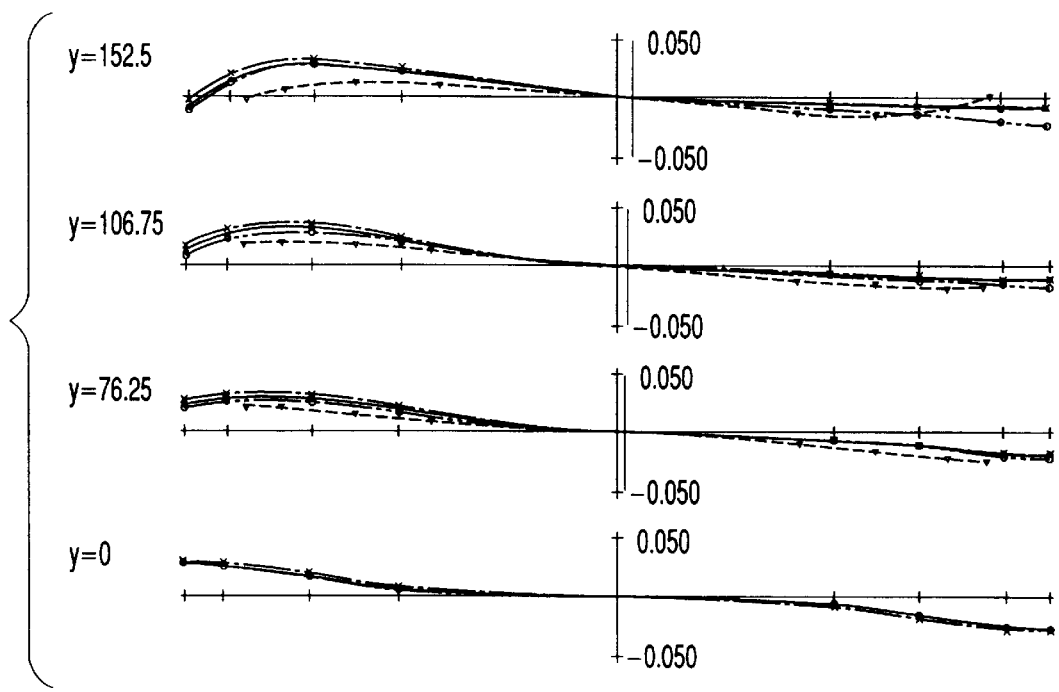

FIGS. 16 and 17 show embodiments of the original reading lens in which the number of lenses is five. When as previously described, the number of lenses is five or greater, the degree of freedom of disposition of the laminated type optical element GP increases, and even if the laminated type optical element GP is disposed forwardly or rearwardly of the stop SP, it is possible to restrain various aberrations well. A case where the laminated type optical element GP is disposed more adjacent to the surface T of the original than the stop SP is described in Numerical Value Embodiment 4, and a case where the laminated type optical element GP is disposed more adjacent to the line sensor IP than the stop SP is described in Numerical Value Embodiment 5. The aberrations in the respective numerical value embodiments are shown in FIGS. 18A, 18B, 19A and 19B, and the values of the coefficient L of on-axis chromatic aberration and the coefficient T of chromatic aberration of magnification in the state wherein the laminated type optical element GP is absent are given in Table 2.

In each numerical value embodiment, of diffracted lights of respective orders diffracted by the laminated type optical element GP and incident on the surface of the CCD (IP), diffracted lights (flare lights) of the other orders than the design order are set so that the quantity of light thereof (the quantity of flare light) may be 5% or less relative to the quantity of light of the diffracted light of the design order. Also, of the diffracted lights of respective orders diffracted by the laminated type optical element GP and incident on the surface of the CCD (IP), the diffracted lights of the other orders than the design order are set so that the quantity of on-axis light thereof (the quantity of flare light) and the quantity of the most off-axial light (the quantity of flare light) may be substantially equal to each other. Thereby, in each numerical value embodiment, the deterioration of images by the influence of the diffracted lights of the other orders than the design order is prevented.

The grating pitch of the diffraction gratings of the first flat glass GP1 and the second flat glass GP2 used in each numerical value embodiment is represented by the following expression:

$$\phi(h)=2\pi/\lambda_0 \cdot (C_2 \cdot h^2 + C_4 \cdot h^4 + C_6 \cdot h^6 + \ldots + C_{2i} \cdot h^{2i}),$$

where $\lambda_0$ is the reference wavelength (d-line) of the light source, h is the distance from the optical axis, $C_{2i}$ (i=1, 2, ...) is the phase coefficient, and $\phi(h)$ is the phase. In each numerical value embodiment, the light of the first order is the design order.

Figure 10:
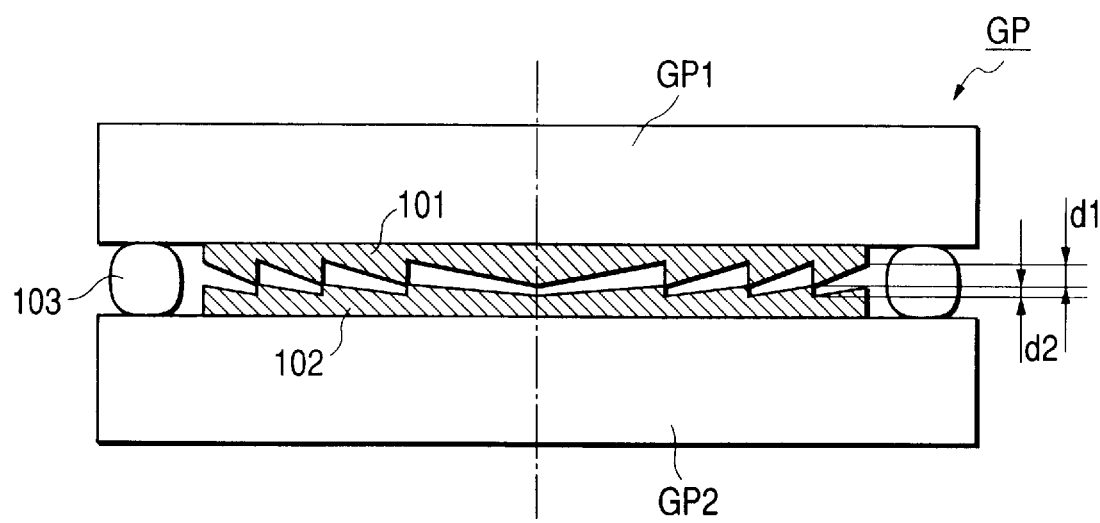
FIG. 10 is an illustration of a laminated type optical element according to the present invention.
Figures 11A, 11B:
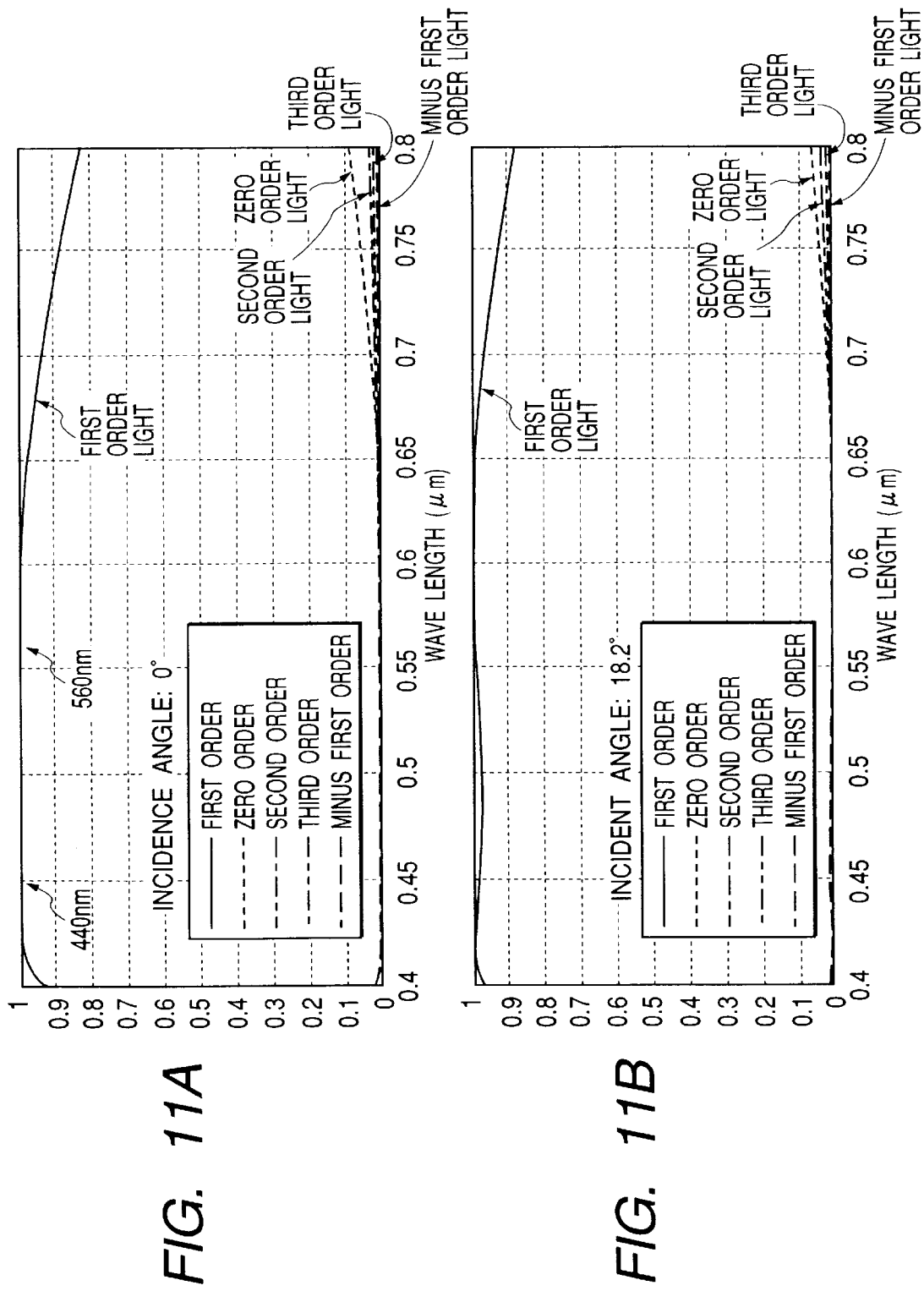
FIGS. 11A and 11B are illustrations of the diffraction efficiency of the laminated type optical element according to the present invention.
Figure 12A:
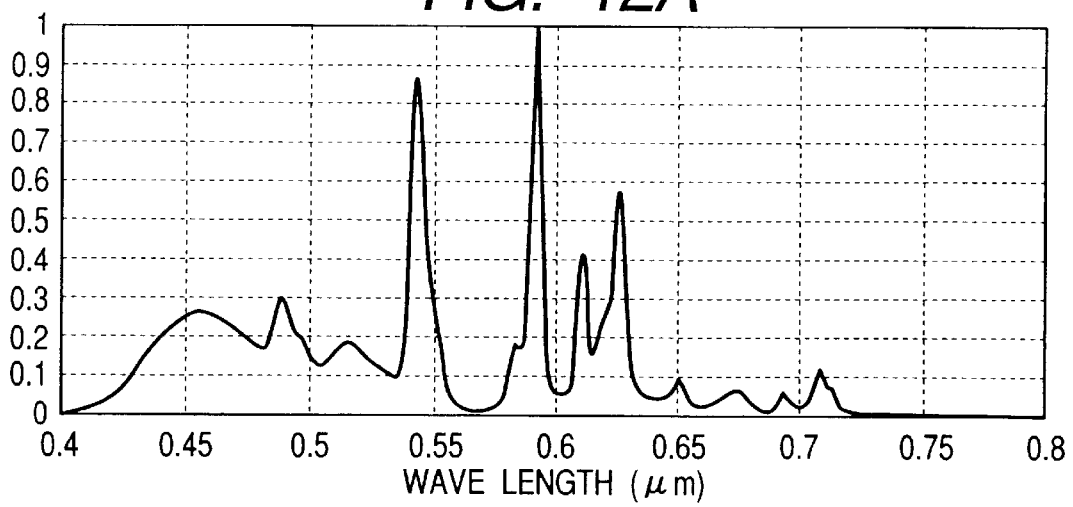
FIG. 12A is a graph illustrating the spectral characteristic of an Xe lamp.
Figure 12B:
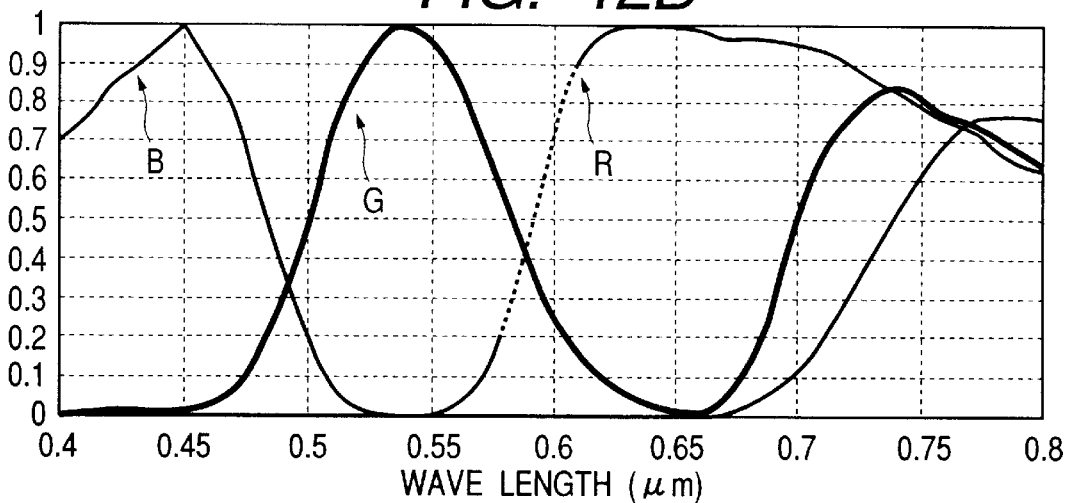
FIG. 12B is a graph illustrating the spectral characteristic of a CCD filter.
Figure 12C:
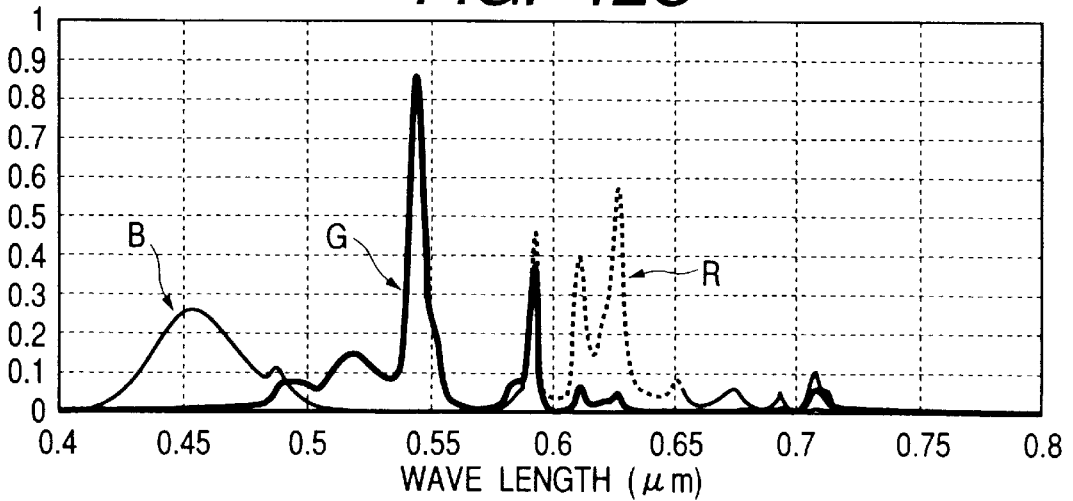
FIG. 12C is a graph illustrating the product of the two characteristics.

FIG. 10 is an illustration for illustrating the laminated type optical element according to the present invention. As shown in FIG. 10, a diffraction grating 101 of a convex shape formed of resin of the ultraviolet ray setting type is formed on the surface of the first flat glass GP1, and a diffraction grating 102 of a concave shape is likewise formed on the surface of the second flat glass GP2. Further, the surfaces of the diffraction gratings are disposed in opposed relationship with each other, and the surroundings thereof are fixed by an adhesive agent 103 to thereby achieve the laminated type optical element GP.

As the resin of the ultraviolet ray setting type of the diffraction grating 101 used in each numerical value embodiment, use is made of RC8922 (registered trademark) (nd=1.5129, vd=51.0) produced by Dainippon Ink Co., Ltd., and as the resin of the ultraviolet ray setting type of the diffraction grating 102, use is made of UV1000 (registered trademark) (nd=1.6363, vd=23.0) produced by Mitsubishi Kagaku Co., Ltd.

In each numerical value embodiment, when the grating depths of the diffraction gratings of the first flat glass GP1 and the second flat glass GP2 are defined as $d_1$ and $d_2$, respectively, the grating depths $d_1$ and $d_2$ are determined from the following expressions:

$$\{n_1(\lambda a)-1\}d_1-\{n_2(\lambda a)-1\}d_2=m\lambda a \quad (1)$$

$$\{n_1(\lambda b)-1\}d_1-\{n_2(\lambda b)-1\}d_2=m\lambda b \quad (2)$$

$$0.40<\lambda a<0.50 \quad (3)$$

$$0.51<\lambda b<0.62 \quad (4)$$

where $n_1$: the refractive index of the material of the first flat glass;

$n_2$: the refractive index of the material of the second flat glass;

$\lambda a$: first set wavelength ($\mu$m);

$\lambda b$: second set wavelength ($\mu$m):

m: 1, 2, 3, . . . .

That is, in each numerical value embodiment, by the use of the above-mentioned expressions (1) and (2), the design order m=1 is set, and the first and second set wavelengths $\lambda a$ and $\lambda b$ are set as $\lambda a=0.44$ ($\mu$m) and $\lambda b=0.56$ ($\mu$m), respectively, and the grating depths of the diffraction gratings of the first flat glass GP1 and the second flat glass GP2 are set as $d_1=8.945$ ($\mu$m) and $d_2=6.310$ ($\mu$m), respectively.

The values of the refractive indices which become necessary in the calculation are $n_1(0.44\ \mu m)=1.52502, n_1(0.56\ \mu m)=1.51445,$ $n_2(0.44\ \mu m)=1.67435$ and $n_2(0.56\ \mu m)=1.64037.$ Consequently, the diffraction efficiency of the set order m=1 becomes great, and the diffraction efficiency of the other set orders become small.

FIGS. 11A and 11B and FIGS. 12A to 12C are illustrations showing the diffraction efficiency (the angle of incidence 0°, incidence at 18.2°) of the laminated type optical element GP used in each numerical value embodiment and the spectral characteristic of the Xe lamp (obtained by multiplying the spectral characteristic of a color filter x the spectral characteristic of the Xe lamp) when a line sensor IP with a color filter is used.

When the grating depths of the diffraction gratings are to be determined, it becomes important to balance the diffraction efficiency of the other orders than the design order low at all angles of view with the maximum angle of incidence onto the diffraction grating surface, the spectral characteristic of the Xe lamp, etc. taken into account. Particularly, as the angle of incidence onto the diffraction grating surface is provided, the diffraction efficiency falls in the intermediate wavelength area of the set wavelengths ($\lambda a$, $\lambda b$) of the light source and therefore, it is necessary to determine the grating depths while being balanced with the fall of the diffraction efficiency in the ultraviolet area and infrared area of on-axis light (the angle of incidence 0°).

Each numerical value embodiment is successful in balancing the flare light low to the order of 1.3% of the first order diffracted light in the on-axis R (red) and the most off-axial B (blue) and G (green).

While in each numerical value embodiments, the Xe lamp is used as the light source, this is not restrictive, but for example, a halogen lamp or the like can be used to obtain an effect similar to that described above. In that case, in order to minimize the flare light, the set wavelengths $\lambda a$ and $\lambda b$ can be determined within the ranges of the aforementioned conditional expressions (3) and (4) to thereby find the grating depths $d_1$ and $d_2$.

Further, while in each numerical value embodiment, the diffraction grating is formed on the flat glass (substrate glass), this is not restrictive, but for example, the diffraction grating can be formed on the surface of a lens having a curvature to obtain an effect similar to that described above.

Also, in each numerical value embodiment, when the Abbe numbers of the materials of the first lens G1 and the fourth lens G4 are defined as vp1 and vp2, respectively, and the Abbe numbers of the materials of the second lens G2 and the third lens G3 are defined as vm1 and vm2, respectively, the conditions that $$50<vp1<95 \quad (5)$$

$$50<vp2<95 \quad (6)$$

$$20<vm1<35 \quad (7)$$

$$20<vm2<35 \quad (8)$$

are satisfied. Thereby, chromatic aberration is corrected well.

Figure 13:
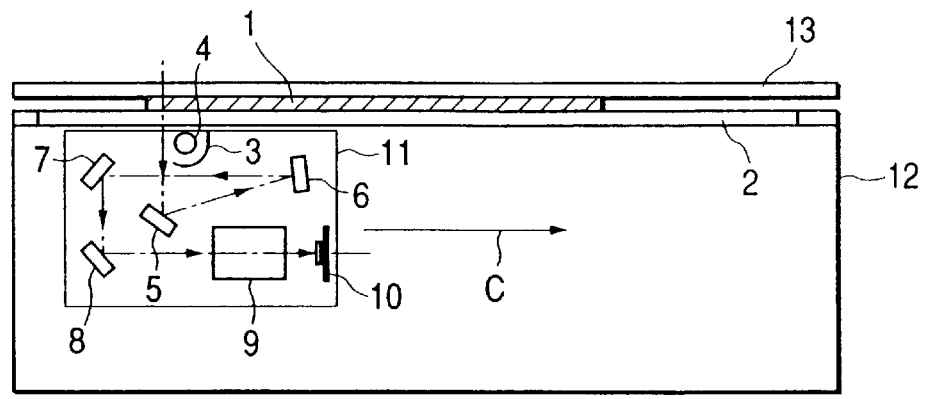
FIG. 13 is a schematic view of essential portions when the original reading lens of the present invention is applied to an original reading apparatus.
Figure 14:
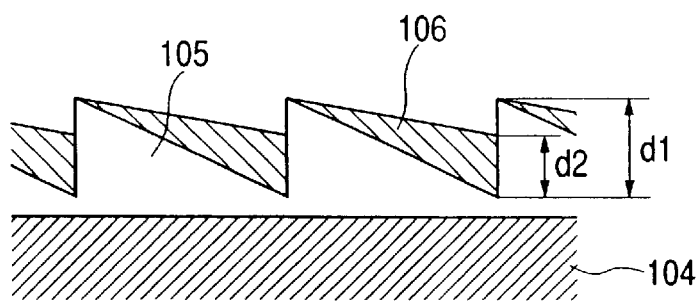
FIG. 14 is an illustration of a laminated type optical element according to an example of the prior art.
Figure 15:
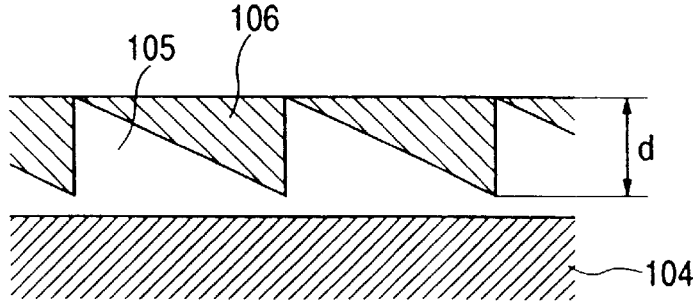
FIG. 15 is an illustration of a laminated type optical element according to an example of the prior art.

FIG. 13 is a schematic view of essential portions when the original reading lens of the present invention is applied to an original reading apparatus such as a digital copier.

In FIG. 13, the reference numeral 2 designates an original supporting glass plate, on the surface of which an original 1 is placed. The reference numeral 11 denotes a carriage integrally containing therein an illuminating light source 4, a reflector 3, a plurality of reflecting mirrors 5, 6, 7, 8, an original reading lens 9 and a reading element (line sensor) 10 which will be described later. The carriage 11 scans in a sub-scanning direction (the direction of arrow C in FIG. 13) by a driving device (not shown) such as a sub-scanning motor, and reads the image information of the original 1. The illuminating light source 4 comprises, for example, an Xe lamp, a halogen lamp or the like. The reflector 3 reflects a beam from the illuminating light source 4 and efficiently illuminates the original. First, second, third and fourth reflecting mirrors 5, 6, 7 and 8 bend the optical path of the beam from the original 1 in the interior of the carriage. The original reading lens 9 according to the present invention is constructed as described previously, and images the beam based on the image information of the original 1 on the surface of the reading element 10. The reading element 10 is a line sensor (CCD). The reference numeral 12 designates a main body, and the reference numeral 13 denotes a pressure plate.

In the present embodiment, the beam emitted from the illuminating light source 4 illuminates the original 1 directly or via the reflector 3, and the reflected light from the original 1 is imaged on the surface of the CCD 10 by the original reading lens 9 with the optical path thereof bent in the interior of the carriage 11 through the intermediary of the first, second, third and fourth reflecting mirrors 5, 6, 7 and 8. The carriage 11 is moved in the direction of arrow C (the sub-scanning direction) by the sub-scanning motor, whereby the image information of the original 1 is read.

Some numerical value embodiments of the present invention will be shown below. In the numerical value embodiments, Ri represents the radius of curvature of the ith surface from the object side, Di represents the thickness and air space of the ith optical material from the object side, and Ni and vi represent the refractive index and Abbe number, respectively, of the ith optical material from the object side.

Numerical Value Embodiment 1

| f = 83.92 | Fno = 4.5 | β = −0.22028 | |
|---|---|---|---|
| R1 = 23.125 | D1 = 6.58 | N1 = 1.60311 | v1 = 60.6 |
| R2 = 48.636 | D2 = 0.79 | | |
| R3 = 19.992 | D3 = 3.60 | N2 = 1.78472 | v2 = 25.7 |
| R4 = 14.547 | D4 = 7.27 | | |
| R5 = ∞ | D5 = 1.00 | N3 = 1.51633 | v3 = 64.1 |
| R6 = 0 (diffracting surface) | D6 = 1.00 | N4 = 1.51633 | v4 = 64.1 |
| R7 = ∞ | D7 = 0.66 | | |
| R8 = 0 (stop) | D8 = 8.46 | | |
| R9 = −13.496 | D9 = 3.60 | N5 = 1.78472 | v5 = 25.7 |
| R10 = −18.427 | D10 = 0.52 | | |
| R11 = −60.843 | D11 = 5.78 | N6 = 1.60311 | v6 = 60.6 |
| R12 = −23.651 | | | |

R6 phase coefficient $C_2 = -2.35432 \times 10^{-4}$ $C_4 = 6.13749 \times 10^{-8}$ $C_6 = -1.06636 \times 10^{-8}$ Numerical Value Embodiment 2

| f = 83.88 | Fno = 4.2 | β = −0.22028 | |
|---|---|---|---|
| R1 = 24.360 | D1 = 4.97 | N1 = 1.69680 | v1 = 55.5 |
| R2 = 49.029 | D2 = 1.56 | | |
| R3 = 22.229 | D3 = 3.97 | N2 = 1.74077 | v2 = 27.8 |
| R4 = 15.320 | D4 = 7.25 | | |
| R5 = ∞ | D5 = 1.00 | N3 = 1.51633 | v3 = 64.1 |
| R6 = 0 (diffracting surface) | D6 = 1.00 | N4 = 1.51633 | v4 = 64.1 |
| R7 = ∞ | D7 = 0.08 | | |
| R8 = 0 (stop) | D8 = 9.19 | | |
| R9 = −14.193 | D9 = 3.68 | N5 = 1.74077 | v5 = 27.8 |
| R10 = −19.221 | D10 = 1.71 | | |
| R11 = −68.221 | D11 = 5.01 | N6 = 1.60311 | v6 = 60.6 |
| R12 = −25.269 | | | |

R6 phase coefficient $C_2 = -3.06307 \times 10^{-4}$ $C_4 = -2.53648 \times 10^{-7}$ $C_6 = -1.25831 \times 10^{-8}$ Numerical Value Embodiment 3

| f = 81.23 | Fno = 5.0 | β = −0.22028 | |
|---|---|---|---|
| R1 = 20.493 | D1 = 4.71 | N1 = 1.60311 | v1 = 60.6 |
| R2 = 45.652 | D2 = 1.60 | | |
| R3 = 18.458 | D3 = 2.86 | N2 = 1.74077 | v2 = 27.8 |
| R4 = 13.682 | D4 = 6.07 | | |
| R5 = ∞ | D5 = 1.00 | N3 = 1.51633 | v3 = 64.1 |
| R6 = 0 (diffracting surface) | D6 = 1.00 | N4 = 1.51633 | v4 = 64.1 |
| R7 = ∞ | D7 = 0 | | |
| R8 = 0 (stope) | D8 = 8.85 | | |
| R9 = −13.524 | D9 = 4.88 | N5 = 1.74077 | v5 = 27.8 |
| R10 = −20.086 | D10 = 1.21 | | |
| R11 = −71.619 | D11 = 4.48 | N6 = 1.60311 | v6 = 60.6 |
| R12 = −25.428 | | | |

R6 phase coefficient $C_2 = -2.52059 \times 10^{-4}$ $C_4 = -6.84531 \times 10^{-7}$ $C_6 = -7.56156 \times 10^{-9}$

TABLE 1

| | | B | R |
|---|---|---|---|
| Numerical Value Embodiment 1 | L (coefficient of on-axis chromatic aberration) | 0.002481 | −0.002596 |
| | T (coefficient of chromatic aberration of magnification) | −0.000114 | 0.000101 |
| Numerical Value Embodiment 2 | L (coefficient of on-axis chromatic aberration) | 0.004287 | −0.003545 |
| | T (coefficient of chromatic aberration of magnification) | −0.000067 | 0.000080 |
| Numerical Value Embodiment 3 | L (coefficient of on-axis chromatic aberration) | 0.003217 | −0.002943 |
| | T (coefficient of chromatic aberration of magnification) | −0.000071 | 0.000059 | reference wavelength 0.543 μm
B wavelength 0.458 μm
R wavelength 0.622 μm

The wavelengths given in Table 1 are indicative of the centroidal wavelengths of the respective colors after the spectral characteristics of the Xe lamp and the spectral characteristic of the filter of the line sensor have been multiplied together.

Numerical Value Embodiment 4

| f = 84.01 | Fno = 4.5 | β = −0.22028 | |
|---|---|---|---|
| R1 = 23.187 | D1 = 7.67 | N1 = 1.60311 | v1 = 60.6 |
| R2 = 50.906 | D2 = 0.27 | | |
| R3 = 19.689 | D3 = 3.04 | N2 = 1.78472 | v2 = 25.7 |
| R4 = 14.612 | D4 = 7.64 | | |
| R5 = 0 | D5 = 1.00 | N3 = 1.51633 | v3 = 64.1 |
| R6 = 0 (diffracting surface) | D6 = 1.00 | N4 = 1.51633 | v4 = 64.1 |
| R7 = 0 | D7 = 0.49 | | |
| R8 = 0 (stop) | D8 = 9.32 | | |
| R9 = −14.924 | D9 = 2.08 | N5 = 1.61293 | v5 = 37.0 |
| R10 = −28.784 | D10 = 4.74 | N6 = 1.62299 | v6 = 58.2 |
| R11 = −21.404 | D11 = 1.95 | | |

-continued

| f = 84.01 | Fno = 4.5 | β = −0.22028 | |
|---|---|---|---|
| R12 = −97.015 | D12 = 5.39 | N7 = 1.60311 | ν7 = 60.6 |
| R13 = −31.734 | | | |

R6 phase coefficient $\Phi(h)=2\pi/\lambda_0 \cdot (C_2 \cdot h^2 + C_4 \cdot h^4 + C_6 \cdot h^6 + \ldots + C_{2i} \cdot h^{2i})$ $C_2 = -2.35650 \times 10^{-4}$ $C_4 = -2.12342 \times 10^{-7}$ $C_6 = -3.10424 \times 10^{-9}$ Numerical Value Embodiment 5

| f = 84.32 | Fno = 4.5 | β = −0.22028 | |
|---|---|---|---|
| R1 = 22.737 | D1 = 5.88 | N1 = 1.60311 | ν1 = 60.6 |
| R2 = 50.898 | D2 = 0.78 | | |
| R3 = 19.737 | D3 = 3.05 | N2 = 1.78472 | ν2 = 25.7 |
| R4 = 14.730 | D4 = 8.43 | | |
| R5 = 0 (stop) | D5 = 0.49 | | |
| R6 = 0 | D5 = 1.00 | N3 = 1.51633 | ν3 = 64.1 |
| R7 = 0 (diffracting surface) | D6 = 1.00 | N4 = 1.51633 | ν4 = 64.1 |
| R8 = 0 | D7 = 9.44 | | |
| R9 = −14.923 | D9 = 3.28 | N5 = 1.161293 | ν5 = 37.0 |
| R10 = −29.933 | D10 = 4.30 | N6 = 1.62299 | ν6 = 58.2 |
| R11 = −21.603 | D10 = 0.48 | | |
| R12 = −96.960 | D12 = 5.64 | N7 = 1.60311 | ν7 = 60.6 |
| R13 = −32.944 | | | |

R7 phase coefficient $C_2 = -2.35997 - 10^{-4}$ $C_4 = -1.98584 - 10^{-7}$ $C_6 = -3.07111 \times 10^{-9}$

TABLE 2

| | | B | R |
|---|---|---|---|
| Numerical Value Embodiment 4 | L (coefficient of on-axis chromatic aberration) | 0.002428 | −0.002406 |
| | T (coefficient of chromatic aberration of magnification) | −0.000057 | 0.000031 |
| Numerical Value Embodiment 5 | L (coefficient of on-axis chromatic aberration) | 0.002541 | −0.002500 |
| | T (coefficient of chromatic aberration of magnification) | 0.000112 | −0.000100 | reference wavelength 0.543 μm
B wavelength 0.458 μm
R wavelength 0.622 μm

According to the present invention, there can be achieved an original reading lens which as described previously, can well correct particularly on-axis chromatic aberration and chromatic aberration of magnification of the various aberrations and highly accurately read image information as electric information by utilizing a laminated type optical element (laminated type diffraction grating) easy to manufacture, and an original reading apparatus using the same.

Also, according to the present invention, there can be achieved an original reading lens of four-unit four-lens construction disposed substantially symmetrically about a stop, as described previously of which the lens construction can be set appropriately. Also, the reading lens can reduce and image the image information of the whole surface of an original on the surface of a reading element with high resolving power in spite of the number of constituent lenses being small, and can decrease flare lights of the other orders than the design order of a diffraction grating. Consequently, an original reading apparatus using reading lens can also be achieved.

What is claimed is:

1. An optical system, for use with a light source that emits light of a reference wavelength, provided with a lens, a stop and a diffraction grating, characterized in that (i) when in a state wherein said diffraction grating is absent, and the value of the coefficient of chromatic aberration of magnification of the wavelength of the long wavelength side relative to the reference wavelength of said light source is positive, said diffraction grating is disposed more adjacent to an incidence surface side than said stop, and (ii) when in the state wherein said diffraction grating is absent, and the coefficient of chromatic aberration of magnification of the wavelength of the long wavelength side relative to the reference wavelength of said light source is negative, said diffraction grating is disposed more adjacent to an emergence side than said stop, wherein said diffraction grating is disposed between said stop and a lens disposed nearest to said stop and is independent of said lens and stop, and said optical system has four or less lenses.

2. An optical system according to claim 1, characterized in that the lens constituting said optical system consists, in succession from the incident surface side, a meniscus-shaped positive first lens having its convex surface facing the incidence surface side, a meniscus-shaped negative second lens having its convex surface facing the incidence surface side, a stop, a meniscus-shaped negative third lens having its convex surface facing the emergence side, and a meniscus-shaped positive fourth lens having its convex surface facing the emergence side.

3. An optical system according to claim 2, characterized in that said diffraction grating is disposed between said second lens and said stop.

4. An optical system according to claim 2, characterized in that when the Abbe numbers of the materials of said first lens and said fourth lens are defined as vp1 and vp2, respectively, and the Abbe numbers of the materials of said second lens and said third lens are defined as vm1 and vm2, respectively, said Abbe numbers vp1 and vp2 are 50 or greater and said Abbe numbers vm1 and vm2 are 35 or less.

5. A reading apparatus provided with a reading lens for imaging image information on the surface of an original illuminated by a light source that emits light of a reference wavelength on the surface of a reading element, and a stop and a diffraction grating disposed in said reading lens, characterized in that (i) when in a state wherein said diffraction grating is absent, and the value of the coefficient of chromatic aberration of magnification of the wavelength of the long wavelength side relative to the reference wavelength of said light source is positive, said diffraction grating is disposed more adjacent to the surface of said original than said stop, and (ii) when in the state wherein said diffraction grating is absent, and the value of the coefficient of chromatic aberration of magnification of the wavelength of the long wavelength side relative to the reference wavelength of said light source is negative, said diffraction grating is disposed more adjacent to said reading element than said stop, wherein said diffraction grating is disposed between said stop and a lens disposed nearest to said stop and is independent of said lens and stop, and said reading lens comprises four or less lenses.

6. A original reading apparatus according to claim 5, characterized in that said reading lens consists, in succession from the surface side of the original, a meniscus-shaped positive first lens having its convex surface facing the surface side of the original, a meniscus-shaped negative second lens having its convex surface facing the surface of the original, a stop, a meniscus-shaped negative third lens having its convex surface facing the reading element side, and a meniscus-shaped positive fourth lens having its convex surface facing the reading element side.

7. A reading apparatus according to claim 6, characterized in that said diffraction grating is disposed between said second lens and said stop.

8. A reading apparatus according to claim 6, characterized in that when the Abbe numbers of the materials of said first lens and said fourth lens are defined as vp1 and vp2, respectively, and the Abbe numbers of the materials of said second lens and said third lens are defined as vm1 and vm2, respectively, said Abbe numbers vp1 and vp2 are 50 or greater and said Abbe numbers vm1 and vm2 are 35 or less.

9. A reading apparatus provided with a reading lens for imaging information on the surface of an original illuminated by a light source on the surface of a reading element, characterized in that said reading lens has a laminated type optical element in which the diffraction grating surfaces of a first substrate provided with a first optical element having a diffraction grating of a convex shape and a second substrate provided with a second optical element having a diffraction grating of a concave shape are joined together in opposed relationship with each other, wherein of diffracted lights of respective orders diffracted by said diffraction gratings and incident on said reading element, diffracted lights of the orders other than the design order are set so that the quantity of light thereof may be 5% or less relative to the quantity of light of the diffracted light of the design order.

10. A reading apparatus provided with a reading lens for imaging information on the surface of an original illuminated by a light source on the surface of a reading element, characterized in that said reading lens has a laminated type optical element in which the diffraction grating surfaces of a first substrate provided with a first optical element having a diffraction grating of a convex shape and a second substrate provided with a second optical element having a diffraction grating of a concave shape are joined together in opposed relationship with each other, wherein of diffracted lights of respective orders diffracted by said diffraction gratings and incident on said reading element, diffracted lights of the orders other than the design order are set so that the quantity of on-axis light thereof and the quantity of the most off-axial light thereof may be substantially equal to each other.

11. A reading apparatus provided with a reading lens for imaging information on the surface of an original illuminated by a light source on the surface of a reading element, characterized in that said reading lens has a laminated type optical element in which the diffraction grating surfaces of a first substrate provided with a first optical element having a diffraction grating of a convex shape and a second substrate provided with a second optical element having a diffraction grating of a concave shape are joined together in opposed relationship with each other, wherein, when the grating depths of the diffraction gratings of said first and second optical elements are defined as $d_1$ and $d_2$, respectively, said grating depths $d_1$ and $d_2$ are determined from the following expressions:

$$\{n_1(\lambda a)-1\}d_1 - \{n_2(\lambda a)-1\}d_2 = m\lambda a$$

$$\{n_1(\lambda b)-1\}d_1 - \{n_2(\lambda b)-1\}d_2 = m\lambda b$$

$$0.40 < \lambda a < 0.50$$

$$0.51 < \lambda b < 0.62$$

where $n_1$: the refractive index of the material of the first optical element;

$n_2$: the refractive index of the material of the second optical element;

$\lambda a$: first set wavelength ($\mu$m);

$\lambda b$: second set wavelength ($\mu$m); and m: 1, 2, 3, . . . .

12. A reading apparatus according to any one of claims 9–11, further comprising a stop, characterized in that (i) when in a state wherein said laminated type optical element is absent, and the value of the coefficient of chromatic aberration of magnification of the wavelength of the long wavelength side relative to the reference wavelength of said light source is positive, said laminated type optical element is disposed more adjacent to the surface side of the original than said stop, and (ii) when in the state wherein said laminated type optical element is absent, and the value of the coefficient of chromatic aberration of magnification of the wavelength of the long wavelength side relative to the reference wavelength of said light source is negative, said laminated type optical element is disposed more adjacent to said reading element side than said stop.

13. A reading apparatus according to claim 12, characterized in that the lens constituting said reading lens comprises four or less lenses, and is a lens in which in the state wherein said laminated type optical element is absent, the value of the coefficient of chromatic aberration of magnification of the wavelength of the long wavelength side relative to the reference wavelength of said light source is positive, and said laminated type optical element is disposed more adjacent to the surface side of the original than said stop.

* * * * *

UNITED STATES PATENT AND TRADEMARK OFFICE
CERTIFICATE OF CORRECTION

PATENT NO. : 6,507,445 B1
DATED : January 14, 2003
INVENTOR(S) : Hidekazu Shimomura It is certified that error appears in the above-identified patent and that said Letters Patent is hereby corrected as shown below:

Column 6,
Line 55, "is" should read -- its --.

Column 15,
Line 8, "original" should be deleted.

Signed and Sealed this

Twenty-second Day of March, 2005

JON W. DUDAS
*Director of the United States Patent and Trademark Office*